(12) United States Patent
Ko

(10) Patent No.: US 10,345,119 B2
(45) Date of Patent: Jul. 9, 2019

(54) SYSTEMS FOR OBSERVING A ROTATION OF A WHEEL

(71) Applicant: GM GLOBAL TECHNOLOGY OPERATIONS LLC, Detroit, MI (US)

(72) Inventor: Yung-Chang Ko, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 15/399,263

(22) Filed: Jan. 5, 2017

(65) Prior Publication Data
US 2018/0188079 A1 Jul. 5, 2018

(51) Int. Cl.
| | | |
|---|---|---|
| G01D 5/34 | (2006.01) | |
| G01D 5/347 | (2006.01) | |
| G01D 5/244 | (2006.01) | |
| G01P 1/02 | (2006.01) | |

(52) U.S. Cl.
CPC ..... *G01D 5/34707* (2013.01); *G01D 5/24442* (2013.01); *G01P 1/026* (2013.01); *G01D 5/3473* (2013.01)

(58) Field of Classification Search
CPC ............... G01D 5/347; G01D 5/34707; G01D 5/34715; G01D 5/3473
USPC ............................... 250/231.13, 231.14, 221
See application file for complete search history.

(56) References Cited

U.S. PATENT DOCUMENTS

| | | | |
|---|---|---|---|
| 2008/0173082 A1* | 7/2008 | Hettle | ................. B60C 23/0408 73/146.5 |
| 2017/0021876 A1* | 1/2017 | Silva | .................... B62D 43/007 |
| 2018/0335442 A1* | 11/2018 | Duch | .................... B60B 27/001 |

\* cited by examiner

*Primary Examiner* — Kevin K Pyo
(74) *Attorney, Agent, or Firm* — Lorenz & Kopf LLP

(57) ABSTRACT

Systems are provided for observing a rotation of a wheel of a vehicle. In one embodiment, a system includes: a wheel insert positioned within a center bore of the wheel. The wheel insert is movable between a first position and a second, expanded position and in the second, expanded position the wheel insert is coupled to the wheel for rotation with the wheel. The rotation of the wheel insert is to be observed by a sensor. The wheel insert includes a plurality of arms that are movable between a first state and a second, expanded state, and at least one of the plurality of arms is moved into the second, expanded state when the wheel insert is in the second, expanded position.

9 Claims, 14 Drawing Sheets

SYSTEMS FOR OBSERVING A ROTATION OF A WHEEL

TECHNICAL FIELD

The present disclosure generally relates to autonomous vehicles, and more particularly relates to systems for observing a rotation of a wheel with a wheel encoder coupled to a wheel of the autonomous vehicle.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Certain systems of the autonomous vehicle may require a speed of the vehicle in order to perform various control functions, such as cruise control and adaptive cruise control. In one example, a speed of the autonomous vehicle may be determined based on a number of revolutions of one or more wheels of the autonomous vehicle.

Accordingly, it is desirable to provide systems for observing a rotation of the one or more wheels of the autonomous vehicle. It is further desirable to provide systems for a wheel encoder that easily attaches to the respective one or more wheels for observing the rotation of the wheel. Furthermore, other desirable features and characteristics of the present disclosure will become apparent from the subsequent detailed description and the appended claims, taken in conjunction with the accompanying drawings and the foregoing technical field and background.

SUMMARY

Systems are provided for observing a rotation of a wheel of a vehicle. In one embodiment, a system includes: a wheel insert positioned within a center bore of the wheel. The wheel insert is movable between a first position and a second, expanded position. In the second, expanded position the wheel insert is coupled to the wheel for rotation with the wheel. The rotation of the wheel insert is observed by a sensor. The wheel insert includes a plurality of arms that are movable between a first state and a second, expanded state, and at least one of the plurality of arms is moved into the second, expanded state when the wheel insert is in the second, expanded position.

The system also includes a sensor coupled to the wheel insert that observes the rotation of the wheel insert. The system further includes an encoder assembly and a coupling member coupled to the wheel insert. The encoder assembly includes the sensor and a shaft, and the coupling member includes a central bore that receives a portion of the shaft. The wheel insert, the coupling member and the shaft rotate with the rotation of the wheel, and the sensor observes the rotation of the shaft. The system includes an anchor coupled to the wheel insert, and the anchor is coupled to the wheel insert so as to be positioned behind the center bore of the wheel. The system includes a mechanical fastener coupling the anchor to the wheel insert. A torque applied to the mechanical fastener moves the wheel insert from the first position to the second, expanded position. The system includes a mounting assembly that couples the sensor to the vehicle. The wheel insert includes an annular projection that defines a perimeter of the wheel insert and a reinforcement portion, and the plurality of arms are spaced apart relative to each other and the reinforcement portion about the perimeter of the wheel insert. The reinforcement portion has a central portion and a plurality of spokes that extend from the central portion to the perimeter, and a respective sub-plurality of arms of the plurality of arms are defined between each of the plurality of spokes.

In one embodiment, a system for observing a rotation of a wheel of a vehicle includes a wheel insert positioned within a center bore of a wheel. The wheel insert is movable between a first position and a second, expanded position. In the second, expanded position the wheel insert is coupled to the wheel for rotation with the wheel. The system includes a coupling member coupled to the wheel insert for rotation with the wheel insert and a sensor coupled to the coupling member that observes a rotation of the coupling member.

The system includes an anchor coupled to the wheel insert. The anchor is coupled to the wheel insert so as to be positioned behind the center bore of the wheel. The system includes a mechanical fastener coupling the anchor to the wheel insert. A torque applied to the mechanical fastener moves the wheel insert from the first position to the second, expanded position. The wheel insert includes a plurality of arms that are movable between a first state and a second, expanded state, and at least one of the plurality of arms is moved into the second, expanded state when the wheel insert is in the second, expanded position. The wheel insert includes an annular projection that defines a perimeter of the wheel insert and a reinforcement portion, and the plurality of arms are spaced apart relative to each other and the reinforcement portion about the perimeter of the wheel insert.

In one embodiment, an autonomous vehicle is provided. The autonomous vehicle includes at least one wheel encoder system that provides sensor data and a controller that, by a processor and based on the sensor data, determines a speed of rotation of a wheel of the autonomous vehicle. The at least one wheel encoder system includes a wheel insert positioned within a center bore of the wheel. The wheel insert is movable between a first position and a second, expanded position and in the second, expanded position the wheel insert is coupled to the wheel for rotation with the wheel. The at least one wheel encoder system includes an encoder assembly having a shaft coupled to the wheel insert for rotation with the wheel, and a sensor that observes the shaft and generates the sensor data based on the observation.

The autonomous vehicle includes a coupling member coupled to the wheel insert. The coupling member includes a central bore that receives a portion of the shaft. The autonomous vehicle includes an anchor coupled to the wheel insert. The anchor is coupled to the wheel insert so as to be positioned behind the center bore of the wheel. The autonomous vehicle also includes a mechanical fastener coupling the anchor to the wheel insert, and a torque applied to the mechanical fastener moves the wheel insert from the first position to the second, expanded position. The wheel insert includes a plurality of arms that are movable between a first state and a second, expanded state, and at least one of the plurality of arms is moved into the second, expanded state when the wheel insert is in the second, expanded position. The wheel insert includes an annular projection that defines a perimeter of the wheel insert and a reinforcement portion, and the plurality of arms are spaced apart relative to each other and the reinforcement portion about the perimeter of the wheel insert. The reinforcement portion has a central portion and a plurality of spokes that extend from the central portion to the perimeter, and a respective sub-plurality of arms of the plurality of arms is defined between each of the plurality of spokes.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems and methods described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
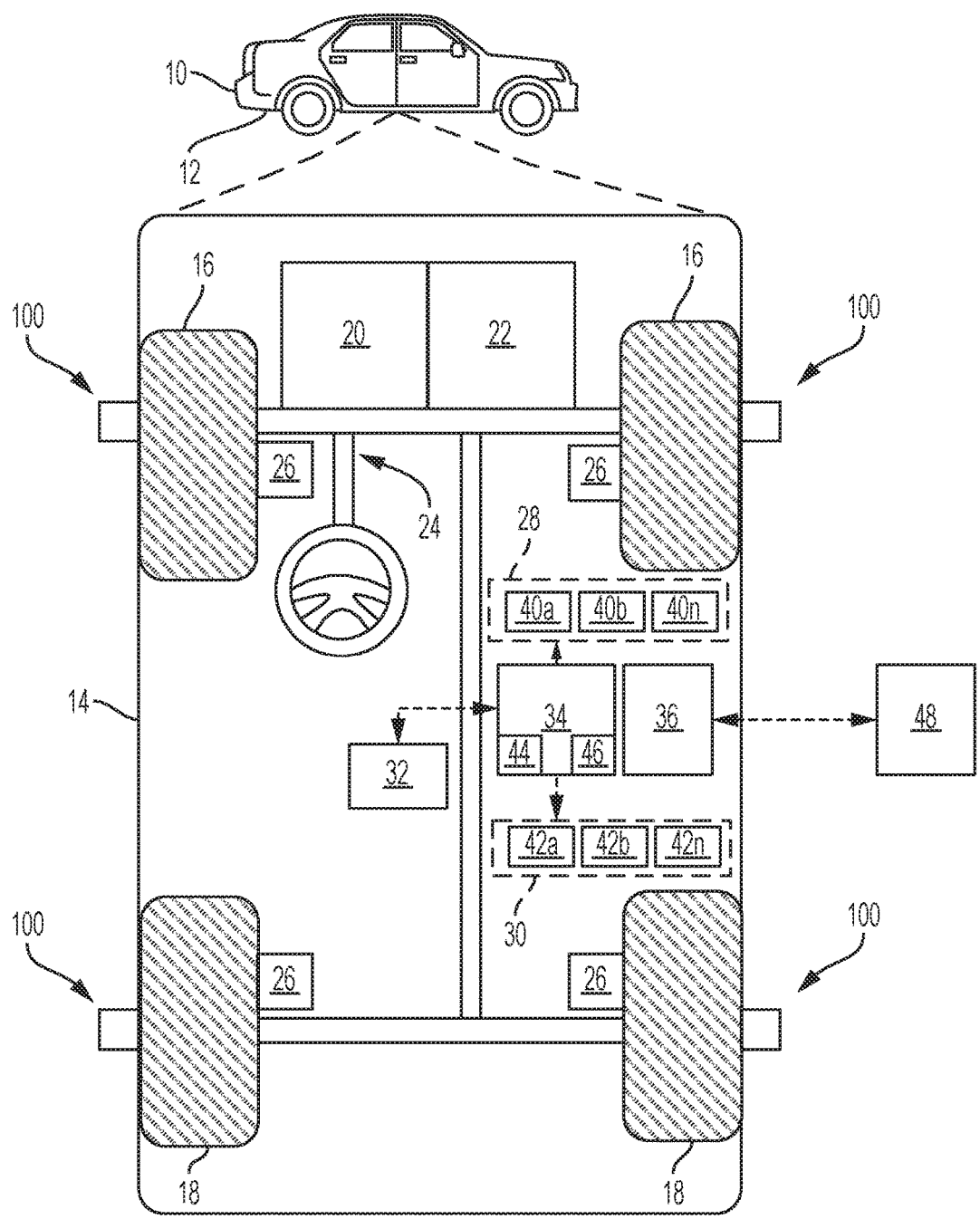
FIG. 1 is a functional block diagram illustrating an autonomous vehicle having a wheel encoder system, in accordance with various embodiments.

With reference to FIG. 1, a wheel encoder system shown generally at 100 is associated with a vehicle 10 in accordance with various embodiments. In general, the wheel encoder system 100 observes a rotation of a wheel of the vehicle 10. The observed rotation may then be used by one or more control systems to compute vehicle parameters, such as wheel speed, vehicle speed, or other parameters.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, a respective wheel encoder system 100 is coupled to one or more of the wheels 16-18. For example, a wheel encoder system 100 may be coupled to each of the wheels 16-18 (as shown), to only the front wheels 16, to only the rear wheels 18, to only one of the wheels, etc.

In various embodiments, the vehicle 10 is an autonomous vehicle and the wheel encoder system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the wheels 16-18 and/or the transmission system 22. The brake system 26 may, in various embodiments, include friction brakes, brake by wire, a regenerative braking system such as an electric machine, and/or other appropriate braking systems. The steering system 24 influences the course of travel by the vehicle 10, for example by adjusting a position of the wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a, 40b . . . 40n that sense observable conditions of the exterior environment, as well as the interior environment and/or operating state of the autonomous vehicle 10. The sensing devices 40a, 40b . . . 40n can include, but are not limited to, radars, lidars, global positioning systems, optical cameras, thermal cameras, ultrasonic sensors, and/or other sensors. In various embodiments, the sensor system 28 includes the wheel encoder system 100. The actuator system 30 includes one or more actuator devices 42a, 42b . . . 42n that control one or more vehicle features, components, systems and/or functions such as, but not limited to, the propulsion system 20, the transmission system 22, the steering system 24, and the brake system 26. In various embodiments, the actuator system 30 may control other vehicle components and/or features, which can further include interior and/or exterior vehicle components and/or features, such as, but are not limited to, doors, a trunk, and cabin features such as air, music, lighting, etc.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are associated with the wheel encoder system 100 and, when executed by the processor 44, the instructions receive and process signals from the wheel encoder system 100 to determine a speed of the respective wheel 16-18 of the vehicle 10. For example, as will be discussed herein, the instructions of the controller 34, when executed by the processor 44, receive and process sensor signals from a sensor associated with the wheel encoder system 100, and determine a rotational speed of the respective wheel 16-18. Based on the determined rotational speed, the processor 44 determines a speed of the vehicle 10. It should be noted, however, that the processor 44 may determine various other parameters based on the determined speed of the respective wheels 16-18, such as wheel slip, direction, etc.

Figure 2:
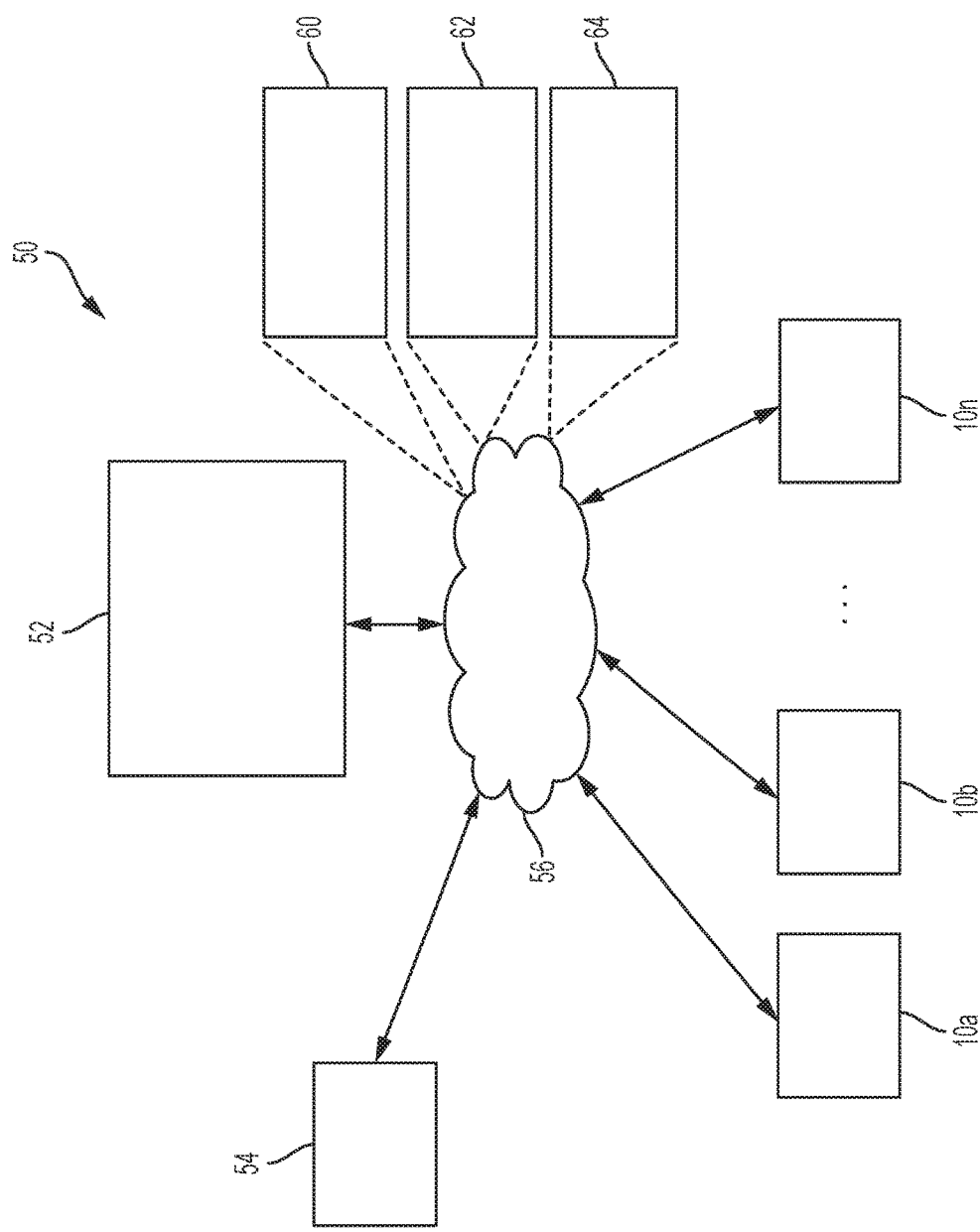
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a, 10b . . . 10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a, 10b . . . 10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a, 10b . . . 10n to schedule rides, dispatch autonomous vehicles 10a, 10b . . . 10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
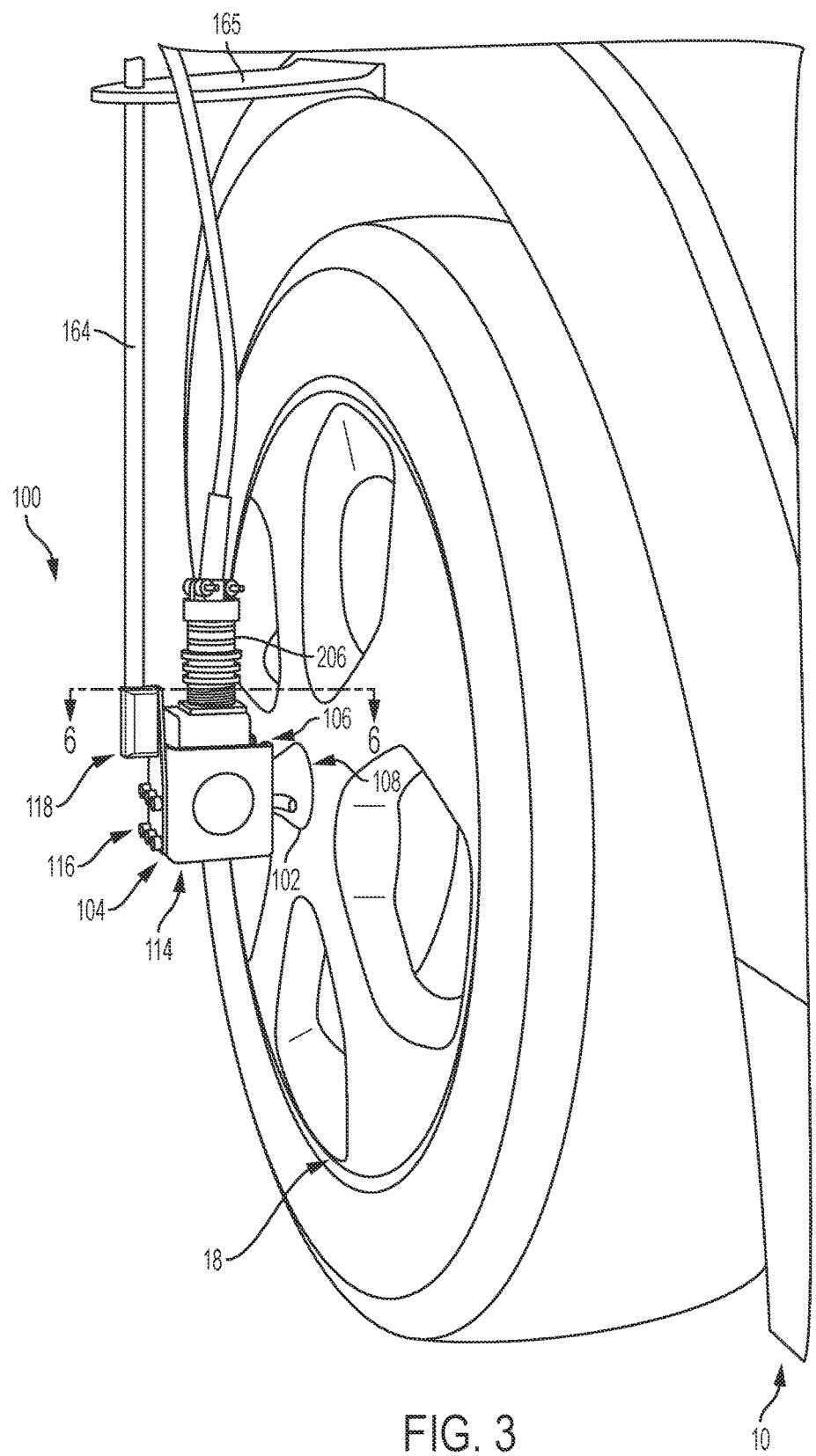
FIG. 3 is a detail view of the wheel encoder system of the autonomous vehicle of FIG. 1 coupled to a wheel of the autonomous vehicle, in accordance with various embodiments.

Referring now to FIG. 3, the wheel encoder system 100 is shown in greater detail in relation to the rear wheel 18. As can be appreciated, the wheel encoder system 100 is the same for each of the wheels 16-18 therefore only one of the wheel encoder systems 100 shown in FIG. 1 will be discussed herein. As shown, the wheel encoder system 100 is coupled to a center bore 102 the rear wheel 18. The wheel encoder system 100 observes a rotation of the rear wheel 18 and generates sensor signals based thereon. The sensor signals generated by the wheel encoder system 100 are communicated to the controller 34 via any suitable communication architecture that facilitates the transfer of data, including a wired or a wireless communication architecture. Thus, it will be understood that the use of a wired connection illustrated herein is merely exemplary, as the sensor signals generated by the wheel encoder system 100 may also be communicated to the controller 34 wirelessly. In one example, with reference to FIG. 4, the wheel encoder system 100 includes a mounting assembly 104, an encoder assembly 106, a coupling member 108, a wheel insert 110 and an anchor 112.

The mounting assembly 104 supports the encoder assembly 106 adjacent to the rear wheel 18 (FIG. 3) and couples the encoder assembly 106 to the vehicle 10 (FIG. 3). In one example, with continued reference to FIG. 4, the mounting assembly 104 includes a mounting bracket 114, a mounting extension 116 and a connector 118. It should be noted that while the mounting bracket 114, the mounting extension 116 and the connector 118 are illustrated and described herein as separate and discrete components, one or more of the mounting bracket 114, the mounting extension 116 and the connector 118 may be integrally formed.

The mounting bracket 114 is coupled to the encoder assembly 106. In this example, the mounting bracket 114 is substantially C-shaped; however, the mounting bracket 114 may have any desired shape. The mounting bracket 114 is composed of a metal or metal alloy, such as aluminum, and may be formed through stamping, casting, machining, selective metal sintering, etc. It will be understood, however, that the mounting bracket 114 may be composed of any suitable material, such as a composite polymer. The mounting bracket 114 includes a base 120, a first extension 122 and a second extension 124.

Figure 4:
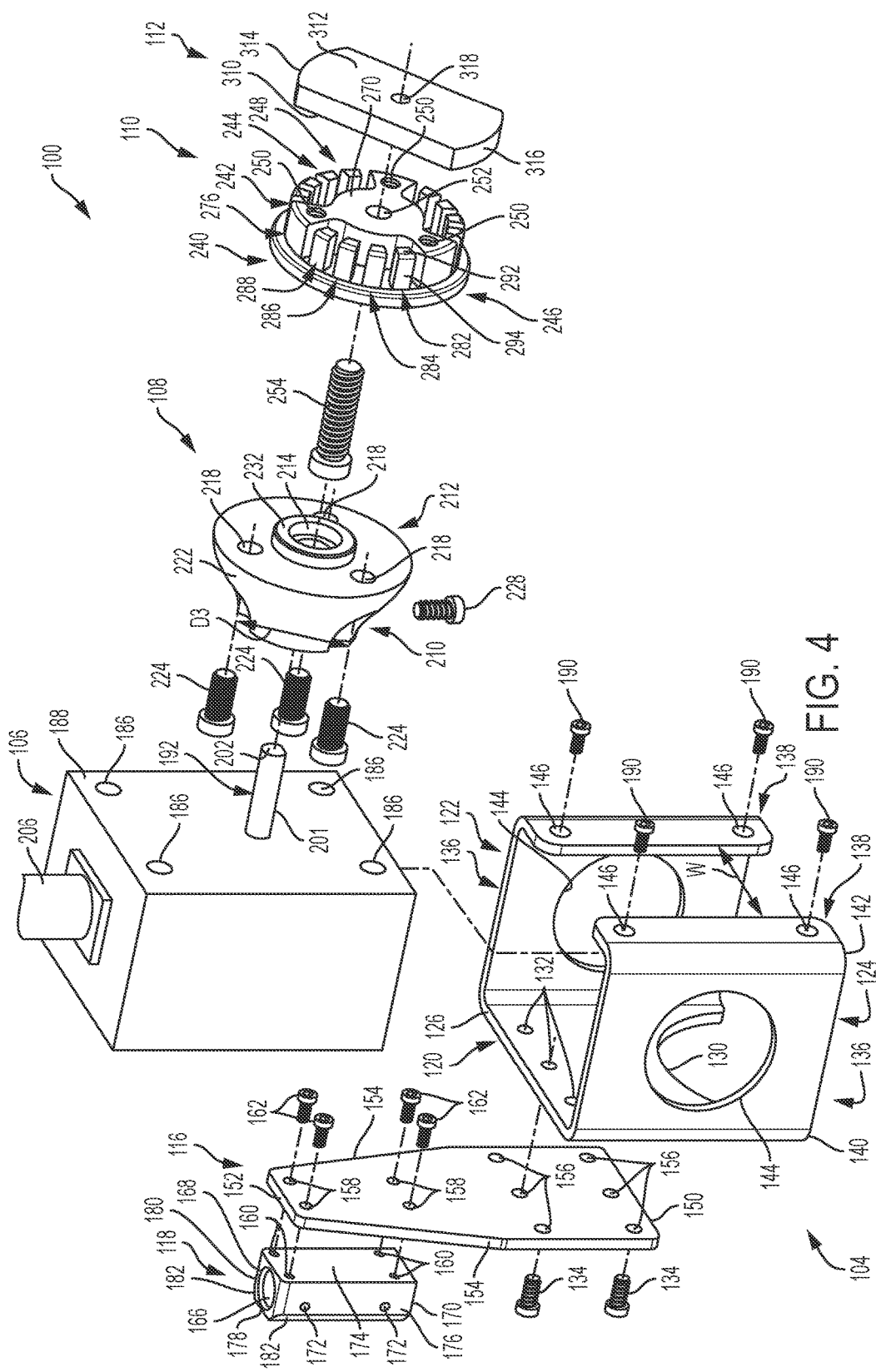
FIG. 4 is an expanded view of the wheel encoder system of FIG. 1, which illustrates a wheel insert of the wheel encoder system in a first position, in accordance with various embodiments.
Figure 5:
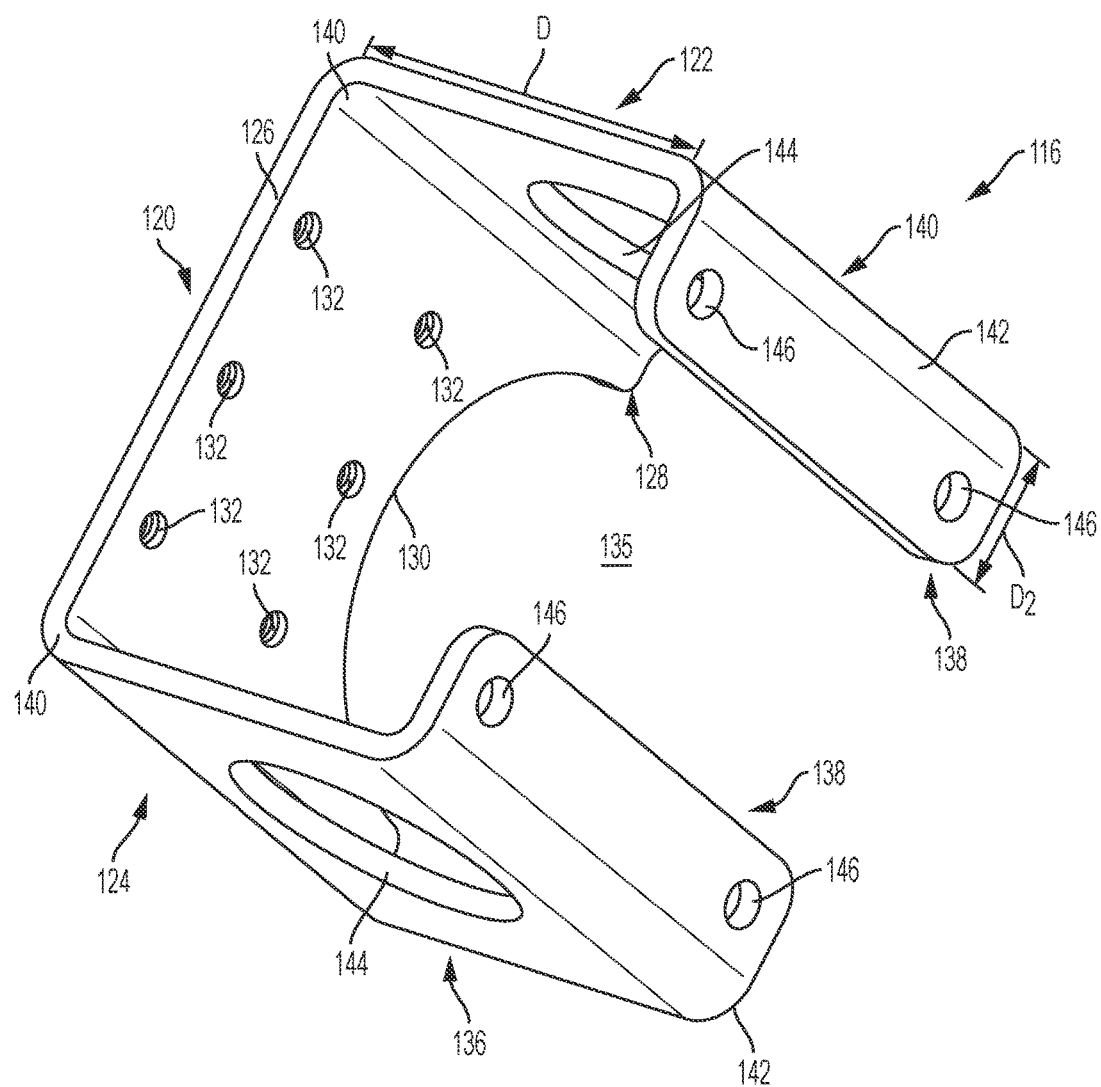
FIG. 5 is a perspective view of a mounting bracket of the wheel encoder system of FIG. 1, in accordance with various embodiments.

With reference to FIG. 5, the base 120 is substantially planar. The base 120 includes a first base end 126 opposite a second base end 128. The second base end 128 defines a recessed portion or cut-out 130. The cut-out 130 is substantially semi-circular, and provides for mass savings. Between the cut-out 130 and the first base end 126, the base 120 defines a plurality of coupling bores 132. Each of the plurality of coupling bores 132 receives respective threaded mechanical fasteners 134 (FIG. 4) to couple the mounting extension 116 to the mounting bracket 114. In this example, each of the plurality of coupling bores 132 includes a respective plurality of threads to threadably engage a respective one of the threaded mechanical fasteners 134 (FIG. 4); however, it will be understood that the plurality of coupling bores 132 need not be threaded. Moreover, while the threaded mechanical fasteners 134 (FIG. 4) are illustrated and described herein for coupling the mounting extension 116 to the mounting bracket 114, it will be understood that any fastening technique may be employed, including, but not limited to, welding, adhesives, rivets, etc.

The first extension 122 and a second extension 124 each extend outwardly from the base 120 to define a receptacle generally indicated by reference numeral 135 for the encoder assembly 106. Generally, each of the first extension 122 and the second extension 124 extend for a distance D, which is sized to enable the encoder assembly 106 to be received within the receptacle 135. The first extension 122 and the second extension 124 each include a body 136 and a flange 138. The body 136 includes a first end 140 coupled to the base 120 and a second end 142 coupled to the flange 138. The body 136 defines a bore 144 between the first end 140 and the second end 142. The bore 144 facilitates the alignment of the encoder assembly 106 within the mounting bracket 114 by providing an operator with a view of the encoder assembly 106 positioned within the mounting bracket 114. The bore 144 also reduces a mass of the mounting bracket 114.

The flange 138 of the first extension 122 extends towards the flange 138 of the second extension 124 to define the substantially C-shape. Each of the flanges 138 define a plurality of encoder coupling bores 146. Each of the encoder coupling bores 146 receive a respective mechanical fastener 148 (FIG. 4), such as a bolt, to couple the encoder assembly 106 to the mounting bracket 114. Generally, the flanges 138 each extend for a distance D2, which enables the encoder assembly 106 to be coupled to the mounting bracket 114, but provides clearance for the movement of a portion of the encoder assembly 106.

With reference to FIG. 4, the mounting extension 116 is coupled to the base 120 of the mounting bracket 114. The mounting extension 116 is composed of a metal or metal alloy, such as aluminum, and may be formed through stamping, casting, machining, selective metal sintering, etc. It will be understood, however, that the mounting extension 116 may be composed of any suitable material, such as a composite polymer. The mounting extension 116 includes a first extension end 150 and a second extension end 152. Generally, the mounting extension 116 tapers on each side 154 from the first extension end 150 to the second extension end 152. The mounting extension 116 is substantially planar, and defines a first sub-plurality of coupling bores 156 and a second sub-plurality of coupling bores 158.

The first sub-plurality of coupling bores 156 are defined between the sides 154 adjacent to, near or at the first extension end 150. The first sub-plurality of coupling bores 156 are defined adjacent to, near or at the first extension end 150 such that when the mounting extension 116 is coupled to the mounting bracket 114, the mounting extension 116 extends beyond the first base end 126. In this example, the first sub-plurality of coupling bores 156 include six bores, but the first sub-plurality of coupling bores 156 may include any number of bores that correspond with the number of coupling bores 132 of the base 120. In addition, the pattern of the first sub-plurality of coupling bores 156 and the coupling bores 132 is merely exemplary, as the first sub-plurality of coupling bores 156 and the coupling bores 132 may be defined through the respective mounting extension 116 and the mounting bracket 114 in any desired configuration. Generally, the first sub-plurality of coupling bores 156 receive the threaded mechanical fasteners 134 to couple the mounting extension 116 to the mounting bracket 114. Thus, a respective one of the first sub-plurality of coupling bores 156 is substantially coaxially aligned with a respective one of the coupling bores 132 to receive a respective one of the threaded mechanical fasteners 134 therethrough.

The second sub-plurality of coupling bores 158 are defined between the sides 154 adjacent to, near or at the second extension end 152. Thus, in this example, the second sub-plurality of coupling bores 158 are spaced apart from the first sub-plurality of coupling bores 156. The second sub-plurality of coupling bores 158 are defined adjacent to, near or at the second extension end 152 such that when the connector 118 is coupled to the mounting extension 116, the connector 118 also extends beyond the first base end 126. In this example, the second sub-plurality of coupling bores 158 include four bores, but the second sub-plurality of coupling bores 158 may include any number of bores that correspond with a number of connector coupling bores 160 of the connector 118. In addition, the pattern of the second sub-plurality of coupling bores 158 and the connector coupling bores 160 is merely exemplary, as the second sub-plurality of coupling bores 158 and the connector coupling bores 160 may be defined through the respective mounting extension 116 and the connector 118 in any desired configuration. Generally, the second sub-plurality of coupling bores 158 receive a respective mechanical fastener 162 to couple the connector 118 to the mounting extension 116. Thus, a respective one of the second sub-plurality of coupling bores 158 is substantially coaxially aligned with a respective one of the connector coupling bores 160 to receive a respective one of the mechanical fasteners 162 therethrough.

The connector 118 couples the mounting assembly 104 to the vehicle 10. In this regard, with brief reference to FIG. 3, the connector 118 receives and is coupled to a support rod 164. The support rod 164 is fixedly coupled to a structure of the vehicle 10, such as a bracket 165, and couples the mounting assembly 104 to the vehicle 10 to prevent the rotation of a portion of the encoder assembly 106 relative to the vehicle 10. Generally, the bracket 165 has a slot, which receives the support rod 164 to couple the support rod 164 to the vehicle 10. In one example, the support rod 164 is coupled to the bracket 165 such that the support rod 164 is slightly deformed within the slot of the bracket 165 to pre-load the connection between the bracket 165 and the support rod 164 to reduce vibrations.

With reference back to FIG. 4, the connector 118 defines a central bore 166, which receives the support rod 164. The central bore 166 extends through the connector 118 from a first connector end 168 to a second connector end 170. In one example, the connector 118 defines one or more set screw bores 172, which receives a respective set screw (not shown). A respective one of the set screws passes through the respective set screw bore 172 to threadably engage a respective bore (not shown) defined in the support rod 164 (FIG. 3) to couple the support rod 164 (FIG. 3) to the connector 118. In addition, the support rod 164 may be coupled to the connector 118 via an interference fit or press-fit within the central bore 166. Alternatively, the central bore 166 may define a plurality of threads for threadably coupling the support rod 164 (FIG. 3) to the connector 118. The connector 118 is composed of a metal or metal alloy, such as aluminum, and may be formed through stamping, casting, machining, selective metal sintering, etc. It will be understood, however, that the connector 118 may be composed of any suitable material, such as a composite polymer.

The connector 118 includes a plurality of sides 174-180, which extend from the first connector end 168 to the second connector end 170 and surround the central bore 166. Generally, each of the sides 174-182 is planar. The side 174 defines the plurality of connector coupling bores 160, and is adjacent to the side 176 that defines the plurality of set screw bores 172. The side 174 is substantially opposite the side 178, and the side 176 is substantially opposite the side 180. Each of the sides 176 and 180 include a chamfer 182; however, the chamfer 182 may be optional.

Figure 6A:
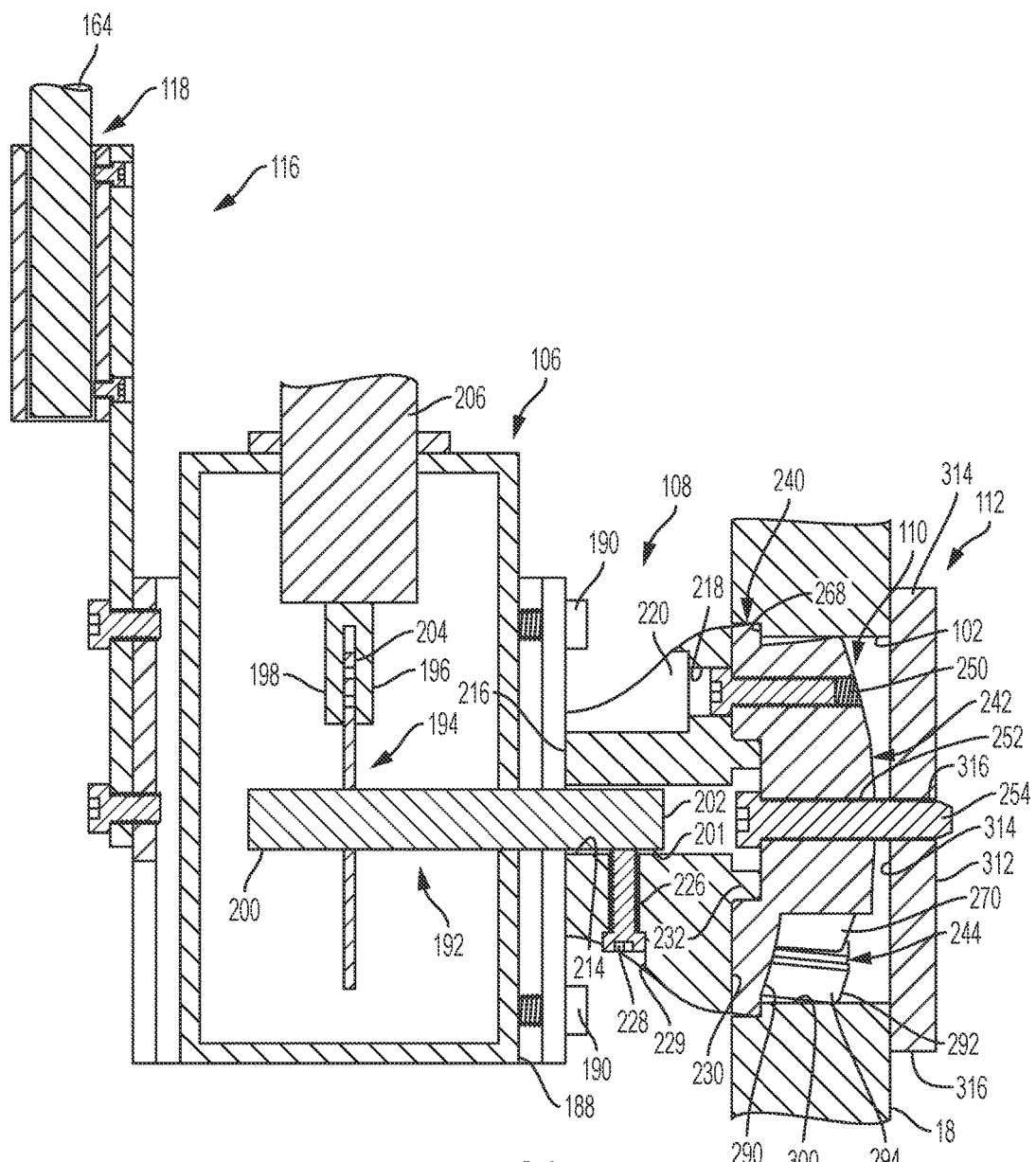
FIG. 6A is a cross-sectional view of the wheel encoder system of the autonomous vehicle of FIG. 1, taken along line 6-6 of FIG. 3, which illustrates the wheel insert of the wheel encoder system in a second, expanded position, in accordance with various embodiments.

The encoder assembly 106 is received within the mounting bracket 114. In this example, the encoder assembly 106 includes a plurality of encoder coupling bores 186 defined through a portion of a housing 188 of the encoder assembly 106. The plurality of encoder coupling bores 186 are coaxially aligned with a respective one of the encoder coupling bores 146 of the mounting bracket 114 to receive a respective mechanical fastener 190 to couple the encoder assembly 106 to the mounting bracket 114. It should be noted that any technique may be employed to couple the encoder assembly 106 to the mounting bracket 114, for example, a press-fit, adhesives, rivets, welding, etc. The housing 188 of the encoder assembly 106 may also be integrally formed with a mounting bracket, if desired. In one example, the encoder assembly 106 is an incremental optical encoder. With reference to FIG. 6A, in one example, the encoder assembly 106 includes a shaft 192, a disk 194, a light source 196 and a sensor or light sensor 198.

The shaft 192 includes a first shaft end 200, a second shaft end 202 and a flat surface 201. The first shaft end 200 is coupled to the disk 194, and the second shaft end 202 is coupled to the coupling member 108. Generally, the shaft 192 is fixedly coupled to the disk 194 and the coupling member 108 such that movement or rotation of the coupling member 108 moves or rotates the disk 194. The shaft 192 is coupled to the disk 194 via any desired technique, including, but not limited to, a press-fit, adhesives, mechanical fasteners, welding, etc. The flat surface 201 is defined along the shaft 192 so as to extend from the second shaft end 202 toward the first shaft end 200. The flat surface 201 provides a contact surface for a set screw 228 to couple the coupling member 108 to the shaft 192, as will be discussed.

The disk 194 is coupled to the shaft 192 adjacent to or near the first shaft end 200 and is disposed within the housing 188 (FIG. 4). The disk 194 generally includes a code track 204 defined about a perimeter of the disk 194. In one example, the code track 204 includes alternating opaque and transparent segments, which are arranged in a predetermined pattern about the perimeter of the disk 194. The light source 196 is positioned such that a light beam from the light source 196 is directed at the code track 204. The light sensor 198 observes the series of light exposures received through the code track 204 and generates sensor signals based on the observation. In one example, the light source 196 is a light emitting diode (LED) and the light sensor 198 is a photodiode array. The light source 196 and the light sensor 198 are in communication with the controller 34 over a communication architecture 206 that facilitates the transfer of data, power, commands, etc. It should be noted that while the communication architecture 206 is illustrated herein as comprising a wired communication architecture, the light source 196 and/or the light sensor 198 may be in wireless communication with the controller 34 over a suitable communication protocol. Moreover, while the wheel encoder system 100 is described herein as including an incremental optical encoder, the wheel encoder system 100 may include any desired encoder, including, but not limited to, an absolute optical encoder, a mechanical absolute encoder, a magnetic absolute encoder, a capacitive absolute encoder, a sine wave encoder, etc.

Figure 7:
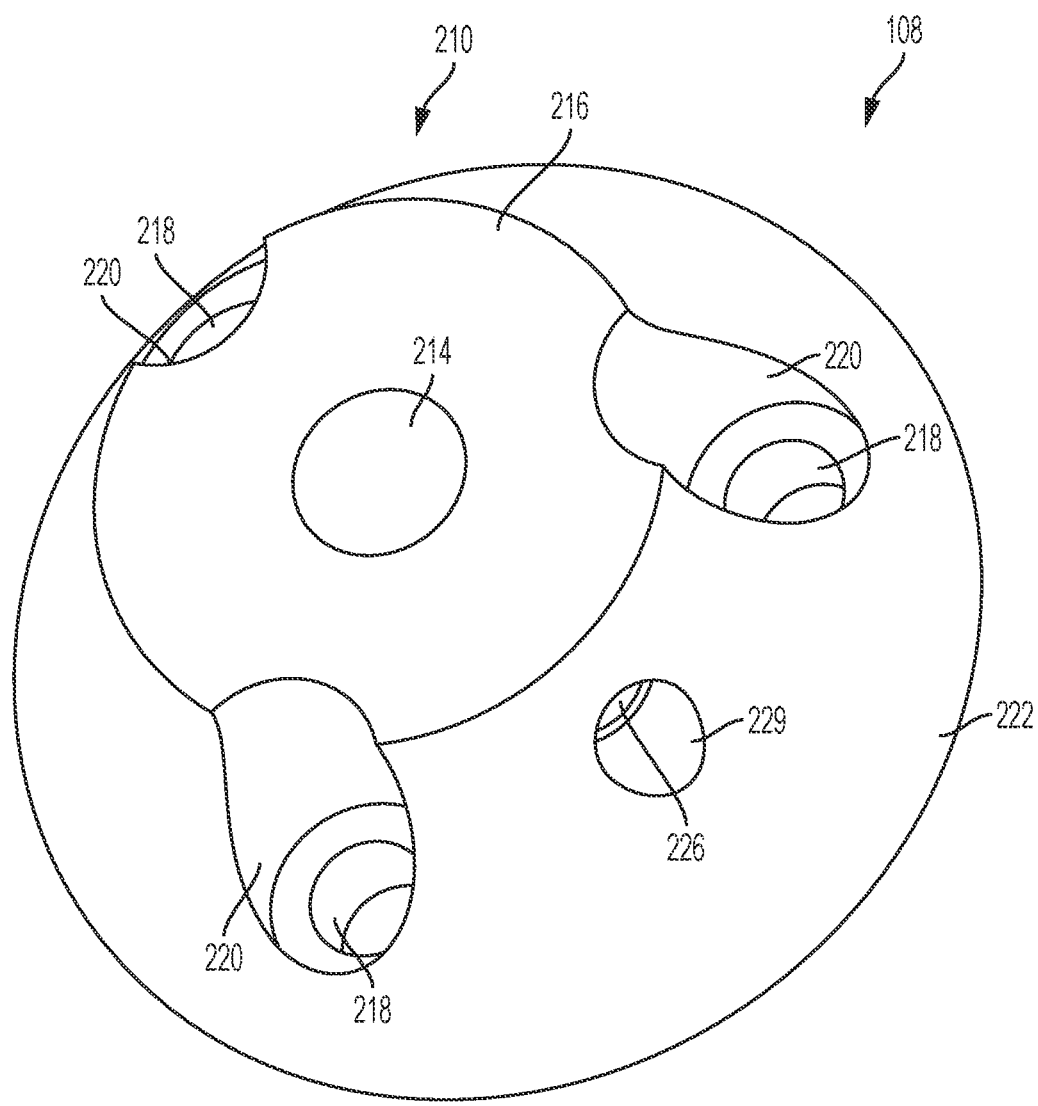
FIG. 7 is a rear perspective view of a coupling member of the wheel encoder system of FIG. 1, in accordance with various embodiments.

With reference to FIG. 4, the coupling member 108 is coupled to the encoder assembly 106 and the wheel insert 110. The coupling member 108 is composed of a metal or metal alloy, such as aluminum, and may be formed through stamping, casting, machining, selective metal sintering, etc. It will be understood, however, that the coupling member 108 may be composed of any suitable material, such as a composite polymer. The coupling member 108 includes a first coupling end 210, a second coupling end 212 and defines a central bore 214 that extends through the first coupling end 210 to the second coupling end 212. The first coupling end 210 has a diameter D3, which is generally smaller than a width W defined between the opposed flanges 138 of the mounting bracket 114 so that the first coupling end 210 may be received between the flanges 138. With reference to FIG. 7, the first coupling end 210 is shown. The first coupling end 210 includes a first surface 216 about which a plurality of coupling member bores 218 is defined. The central bore 214 also terminates at the first surface 216. The first surface 216 is substantially planar to be positioned against the housing 188 (FIG. 4) of the encoder assembly 106 when the coupling member 108 is coupled to the encoder assembly 106. The first surface 216 is generally circular; however, the first surface 216 may have any desired shape.

The plurality of coupling member bores 218 are generally defined through the first surface 216 to extend through to the second coupling end 212 (FIG. 4). The plurality of coupling member bores 218 each include a counterbore 220 defined through a portion of the first surface 216, which extends along a sidewall 222 of the coupling member 108 to be adjacent to or near the second coupling end 212 (FIG. 4). The plurality of coupling member bores 218 are generally defined so as to be substantially evenly spaced about a perimeter or circumference of the first surface 216; however, it will be understood that the plurality of coupling member bores 218 need not be evenly spaced. Moreover, while three coupling member bores 218 are illustrated herein, the plurality of coupling member bores 218 may include any number of coupling member bores 218, such as one. The plurality of coupling member bores 218 each receives a respective mechanical fastener 224 (FIG. 4) to couple the coupling member 108 to the wheel insert 110 (FIG. 4).

The sidewall 222 of the coupling member 108 is defined between the first coupling end 210 and the second coupling end 212. The sidewall 222 generally tapers to the first coupling end 210 from the second coupling end 212. The sidewall 222 also defines a set screw bore 226. The set screw bore 226 includes a plurality of threads, which threadably engage with a plurality of threads of the set screw 228 (FIG. 6A) to enable the set screw 228 to be advanced through the set screw bore 226 into contact with the flat surface 201 of the shaft 192 to fixedly couple the shaft 192 to the coupling member 108. The set screw bore 226 also includes a counterbore 229, which is defined through the sidewall 222. The set screw bore 226 terminates in the central bore 214. Stated another way, the set screw bore 226 intersects the central bore 214 such that the set screw 228 may be advanced through the set screw bore 226 and enter into the central bore 214 to contact the flat surface 201 of the shaft 192 (FIG. 6A), thereby fixedly coupling the shaft 192 to the coupling member 108.

Figure 8:
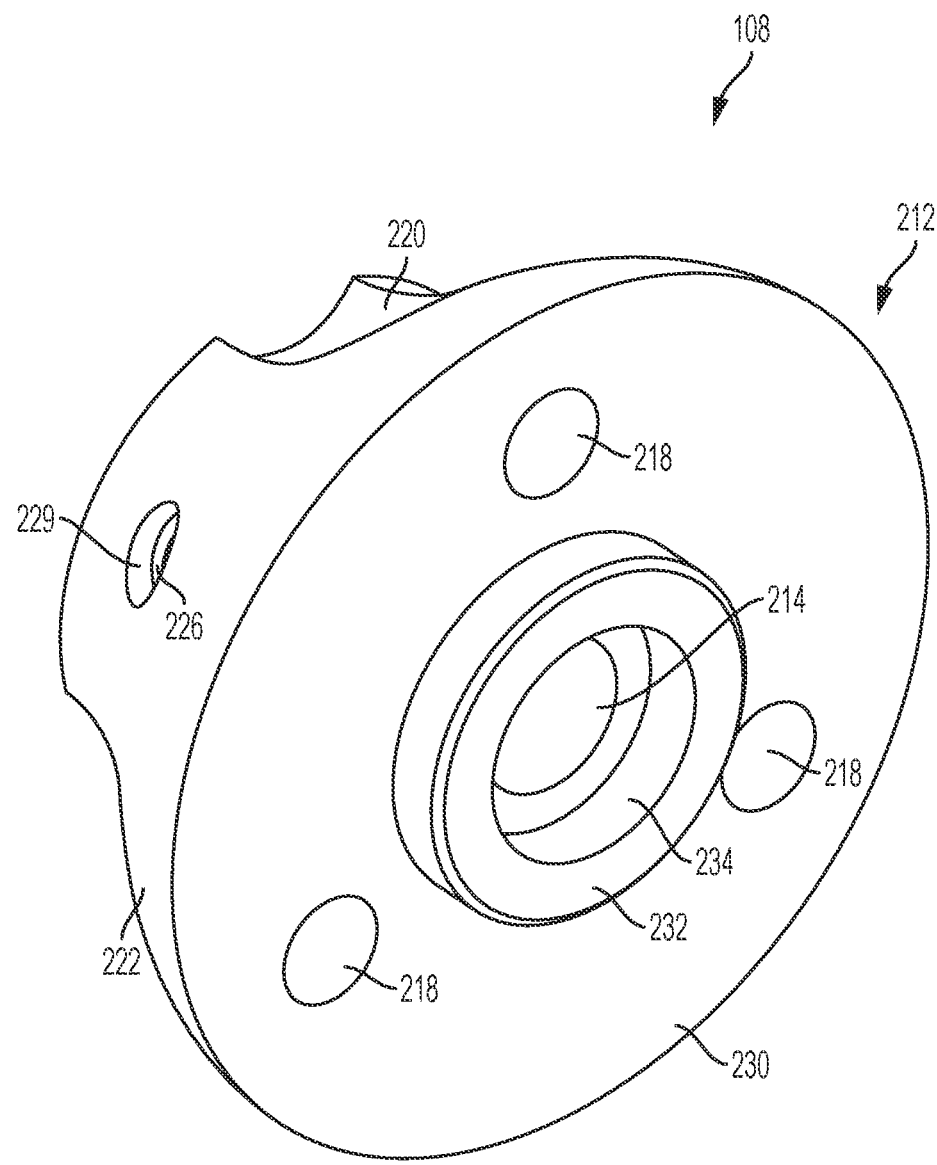
FIG. 8 is a front perspective view of the coupling member of FIG. 7, in accordance with various embodiments.

With reference to FIG. 8, the second coupling end 212 is shown. The second coupling end 212 couples the coupling member 108 to the wheel insert 110. The second coupling end 212 includes a second surface 230 and a flange 232. The second surface 230 is substantially planar for positioning adjacent to a corresponding surface of the wheel insert 110. The plurality of coupling member bores 218 terminate at the second surface 230. The flange 232 extends outwardly from the second surface 230 and provides a locating feature for coupling the coupling member 108 to the wheel insert 110. In one example, the flange 232 is substantially annular; however the flange 232 may have any desired shape, and may include one or more keys to assist in coupling the coupling member 108 to the wheel insert 110. The flange 232 generally extends from the second surface 230 to define a counterbore 234 at an end of the central bore 214. The counterbore 234 facilitates the coupling of the wheel insert 110 to the anchor 112, as will be discussed further herein.

With reference to FIG. 6A, the central bore 214 couples the coupling member 108 to the second shaft end 202. The central bore 214 is defined through the coupling member 108 along a central axis of the coupling member 108 and terminates at a first end at the first surface 216, and terminates at a second end at the second surface 230. The second shaft end 202 is received within the central bore 214 near the first surface 216, and the set screw 228 received through the set screw bore 226 couples the shaft 192 to the coupling member 108 by contacting the flat surface 201 of the shaft 192 such that the shaft 192 rotates with the rotation of the coupling member 108.

The wheel insert 110 is received within the center bore 102 of the rear wheel 18. The wheel insert 110 is coupled to the center bore 102 such that the rotation of the rear wheel 18 rotates the wheel insert 110, which in turn rotates the coupling member 108 and the shaft 192 of the encoder assembly 106. The wheel insert 110 is also coupled to the anchor 112. As will be discussed, the coupling of the wheel insert 110 to the anchor 112 causes the wheel insert 110 to move from a first position (FIG. 4) to a second, expanded position (FIG. 6A). The wheel insert 110 is composed of a metal or metal alloy, such as aluminum, and may be formed through stamping, casting, machining, selective metal sintering, etc. It will be understood, however, that the wheel insert 110 may be composed of any suitable material, such as a composite polymer.

With reference to FIG. 4, the wheel insert 110 includes a flange 240, a reinforcement member 242 and a plurality of arms 244. Generally, the flange 240 defines a first end 246 of the wheel insert 110, and the reinforcement member 242 and the plurality of arms 244 cooperate to define a second end 248 of the wheel insert 110. A plurality of first coupling bores 250 are defined through the wheel insert 110 from the first end 246 to the second end 248, and a central coupling bore 252 is defined through the wheel insert 110 from the first end 246 to the second end 248. Each of the plurality of first coupling bores 250 includes a plurality of threads, which threadably engage a respective one of the mechanical fasteners 224 received into the respective one of the plurality of first coupling bores 250 to couple the coupling member 108 to the wheel insert 110. Thus, the plurality of first coupling bores 250 are substantially coaxially aligned with a respective one of the coupling member bores 218 to couple the coupling member 108 to the wheel insert 110. The central coupling bore 252 includes a plurality of threads, which threadably engages a mechanical fastener 254 to couple the wheel insert 110 to the anchor 112. In this example, the mechanical fastener 254 is a M6 screw; however, any mechanical fastener may be used to couple the wheel insert 110 to the anchor 112.

Figure 9:
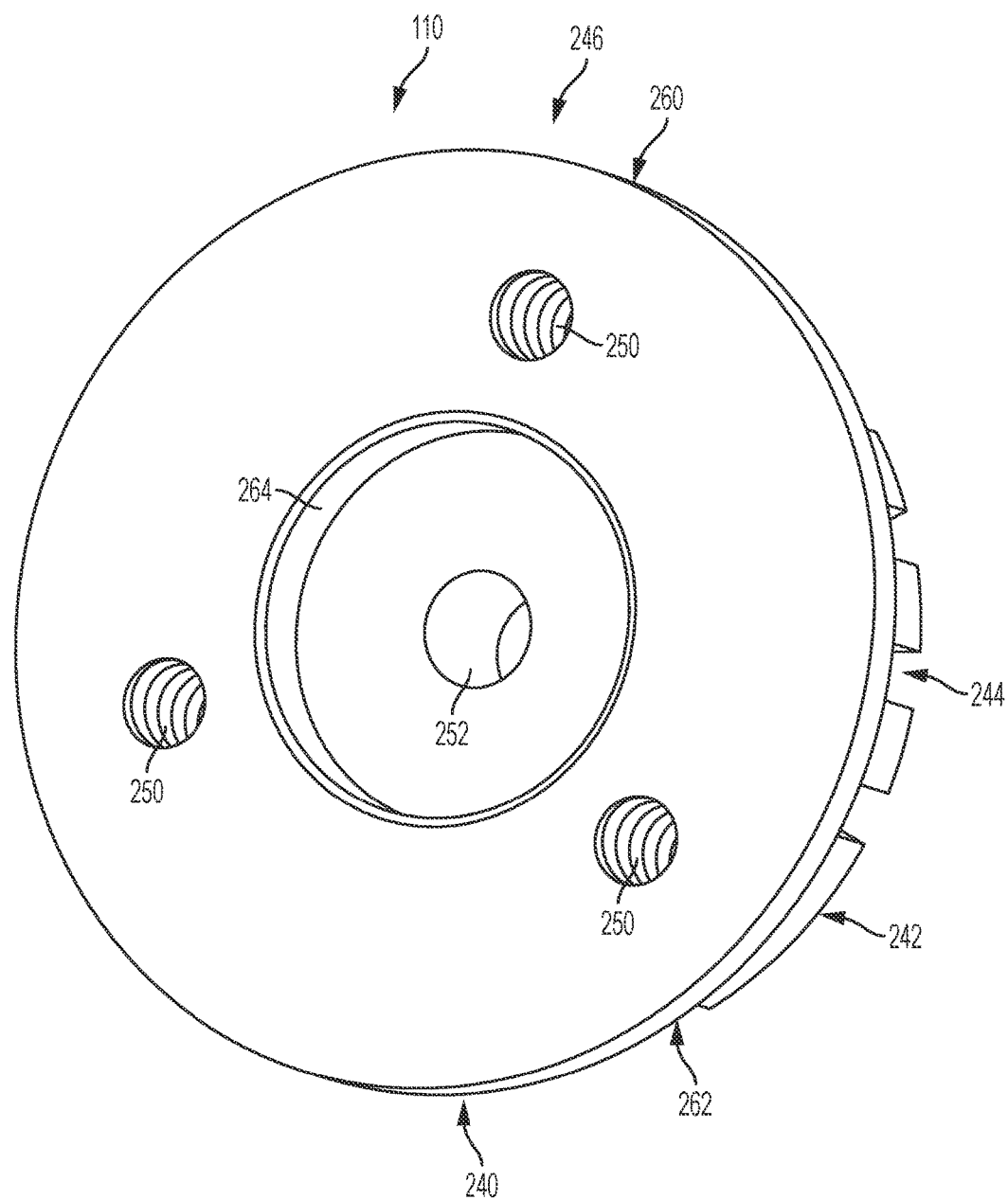
FIG. 9 is a rear perspective view of the wheel insert of the wheel encoder system of FIG. 1, in accordance with various embodiments.

With reference to FIG. 9, the first end 246 of the wheel insert 110 including the flange 240 is shown. The flange 240 includes a first flange surface 260 opposite a second flange surface 262. The first flange surface 260 is substantially planar for positioning against the second surface 230 of the coupling member 108. The first flange surface 260 includes a counterbore 264. The counterbore 264 has a depth sized to receive the flange 232 of the coupling member 108. Thus, the counterbore 264 cooperates with the flange 232 to position the coupling member 108 relative to the wheel insert 110 for coupling the coupling member 108 to the wheel insert 110. The counterbore 264 is substantially circular, but may have any desired shape to mate with the flange 232 of the coupling member 108.

Figure 10:
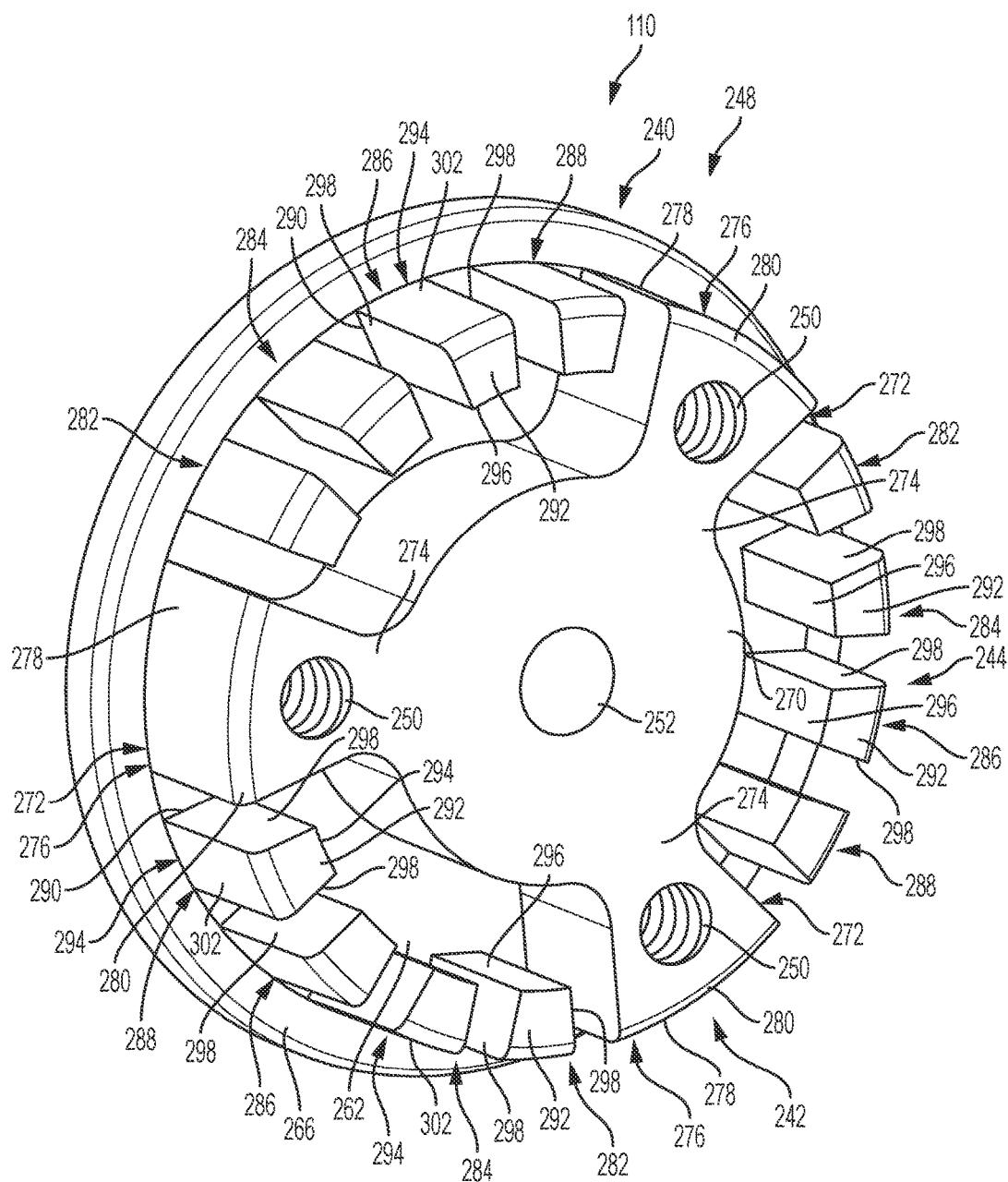
FIG. 10 is a front perspective view of the wheel insert of FIG. 9, which illustrates the wheel insert in the first position, in accordance with various embodiments.

With reference to FIG. 10, the second end 248 of the wheel insert 110 including the second flange surface 262, the reinforcement member 242 and the plurality of arms 244 is shown. The second flange surface 262 includes an annular projection 266, which extends about a perimeter or circumference of the second flange surface 262. The annular projection 266 is generally defined at an outer circumference of the flange 240, and with brief reference to FIG. 6A, the annular projection 266 mates with a lip 268 defined about a perimeter or circumference of the center bore 102. The contact between the annular projection 266 and the lip 268 assists in moving the wheel insert 110 to the second, expanded position, as will be discussed below.

With reference back to FIG. 10, the reinforcement member 242 and the plurality of arms 244 extend outwardly from the second flange surface 262, and are generally defined to be within a perimeter defined by the annular projection 266. Stated another way, the annular projection 266 generally surrounds or circumscribes the reinforcement member 242 and the plurality of arms 244 and defines a perimeter of the wheel insert 110. The reinforcement member 242 provides an area of increased thickness that provides strength and integrity for fastening the coupling member 108 to the wheel insert 110. In one example, the reinforcement member 242 includes a central portion 270 and a plurality of spokes 272. The central portion 270 is substantially circular, and surrounds the central coupling bore 252. Each of the plurality of spokes 272 extend radially outward from the central portion 270 to the perimeter defined by the annular projection 266 and are substantially evenly spaced about a circumference of the central portion 270. Each of the plurality of spokes 272 is associated with a respective one of the plurality of first coupling bores 250. Stated another way, a respective one of the plurality of first coupling bores 250 is defined through a respective one of the plurality of spokes 272. Generally, each of the plurality of spokes 272 is coupled to the central portion 270 at a first spoke end 274, and terminates in a second spoke end 276, which is adjacent to, near or in contact with the annular projection 266. In this example, the second spoke end 276 contacts the annular projection 266.

In one example, the second spoke end 276 includes a taper 278. The taper 278 is defined along the second spoke end 276 from the annular projection 266 to a terminal end 280. The taper 278 assists in the insertion of the wheel insert 110 into the center bore 102 (FIG. 3), and also enables self-centering of the wheel insert 110 within the center bore 102. In this example, the taper 278 is about 0.7 degrees to about 1.0 degrees. It should be noted that the taper 278 may be optional.

Figure 6B:
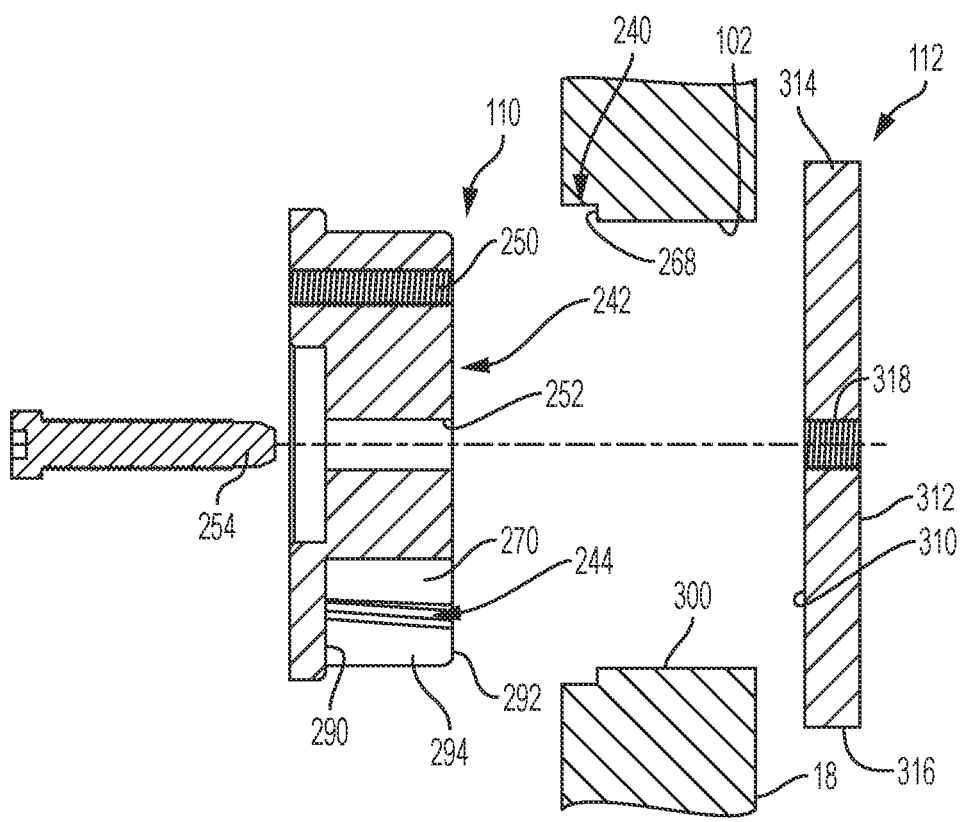
FIG. 6B is an expanded view of the wheel encoder system of FIG. 6A, which illustrates the wheel insert of the wheel encoder system in the first position prior to coupling the wheel insert to a center bore of the wheel of the autonomous vehicle of FIG. 1, in accordance with various embodiments.
Figure 11:
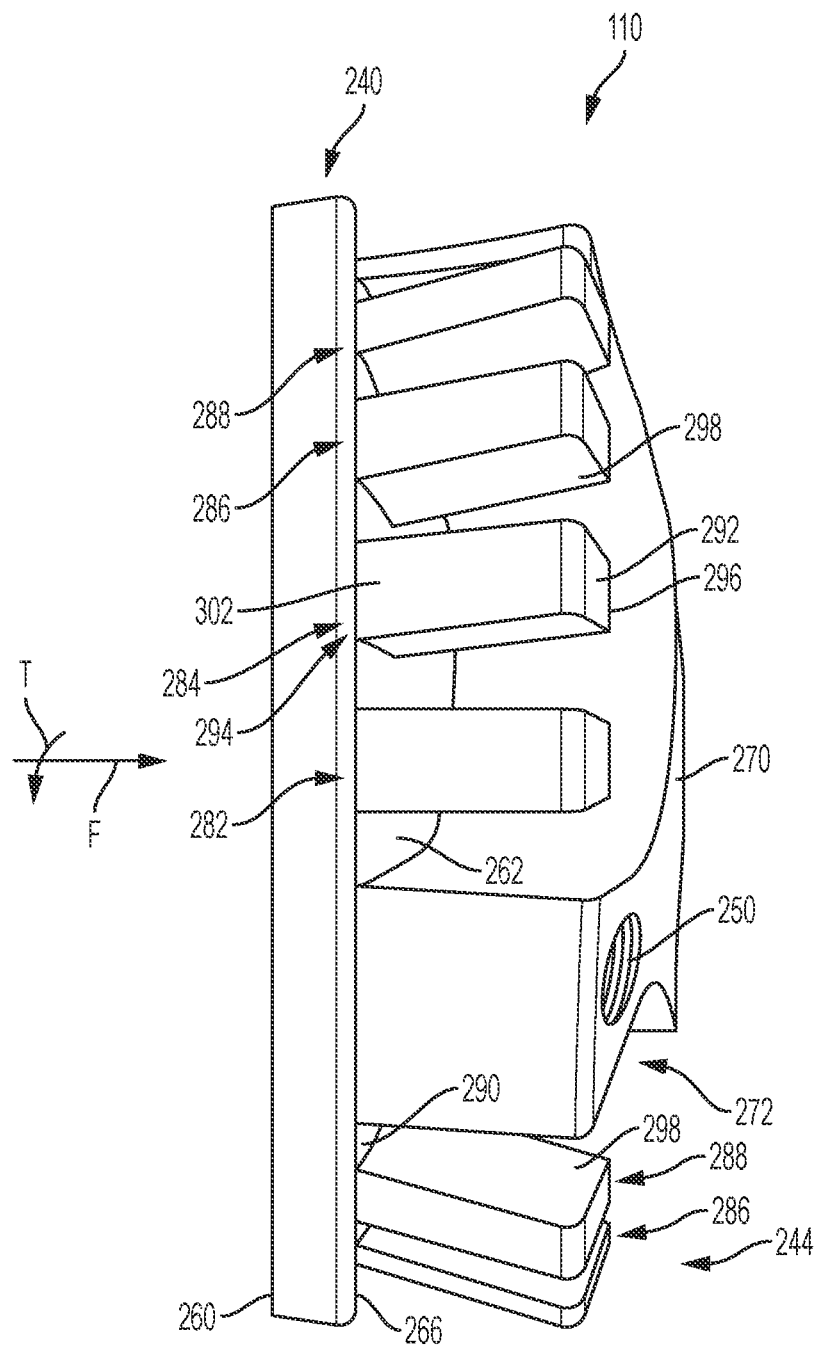
FIG. 11 is a side view of the wheel insert of FIG. 9, which illustrates the wheel insert in the second, expanded position, in accordance with various embodiments.

The plurality of arms 244 extend outwardly from the second flange surface 262 adjacent to, near or at the annular projection 266. In this example, the plurality of arms 244 contacts the annular projection 266. The plurality of arms 244 are defined about the perimeter or circumference defined by the annular projection 266 so as to be spaced apart from each other and from each of the plurality of spokes 272. Generally, the plurality of arms 244 are substantially evenly spaced relative to each other and relative to the plurality of spokes 272 about the circumference of the annular projection 266. Thus, the second end 248 of the wheel insert 110 is substantially symmetric about a rotational axis of the rear wheel 18 (FIG. 3). As will be discussed further herein, the plurality of arms 244 are movable between a first state (FIGS. 4 and 6B), and a second, expanded state (FIGS. 6A and 11) to couple the wheel insert 110 to the center bore 102 (FIG. 3). It should be noted that for illustration purposes, the second, expanded state of the plurality of arms in FIGS. 6A and 11 is slightly exaggerated to show the difference in the plurality of arms 244 between the first state and the second, expanded state. Generally, the plurality of arms 244 in the second, expanded state are displaced or outwardly deformed about 0.01 millimeters (mm) to about 0.03 millimeters (mm). Thus, in the second, expanded position of the wheel insert 110, one or more of the plurality of arms 244 are in the second, expanded state and one or more of the plurality of arms 244 contact a portion of the center bore 102 to assist in coupling the wheel insert 110 to the center bore 102 (FIG. 6A).

In this example, the plurality of arms 244 of the wheel insert 110 includes four sub-plurality of arms 282-288 between each of the plurality of spokes 272. It should be noted that the plurality of arms 244 need not include twelve arms grouped in sub-pluralities of four of the arms 282-288, but rather, the plurality of arms 244 may include any number of arms between each of the spokes 272. Each one of the arms 282-288 includes a first end 290, a second end 292, an exterior side 294, an interior side 296 and a pair of sidewalls 298. The first end 290 is coupled to the second flange surface 262. The second end 292 forms a terminal end of the respective arm 282-288, and with brief reference to FIG. 6A, the second end 292 contacts a sidewall 300 of the center bore 102 when the wheel insert 110 is in the second, expanded position. With reference back to FIG. 10, the exterior side 294 may also contact a portion of the sidewall 300 (FIG. 6A) when the wheel insert 110 is in the second, expanded position. The exterior side 294 is opposite the interior side 296, and also contacts the annular projection 266. In one example, the exterior side 294 includes a taper 302. The taper 302 is defined along the exterior side 294 from the first end 290 to the second end 292. The taper 302 assists in the insertion of the wheel insert 110 into the center bore 102 (FIG. 3), and also enables self-centering of the wheel insert 110 within the center bore 102. In this example, the taper 302 is about 0.7 degrees to about 1.0 degrees. Thus, the taper 302 may be substantially the same as the taper 278 defined on the reinforcement member 242. It should be noted that the taper 302 may be optional, and that the taper 302 may vary from the taper 278.

The interior side 296 faces the central portion 270 of the reinforcement member 242. The interior side 296 is generally spaced apart from the central portion 270 to enable each of the arms 282-288 to move or flex relative to the central portion 270 into the second, expanded state. The pair of sidewalls 298 couples the exterior side 294 to the interior side 296. The pair of sidewalls 298 generally taper from the exterior side 294 to the interior side 296.

With reference to FIG. 11, the wheel insert 110 is shown in the second, expanded position, and the plurality of arms 244 are in the second, expanded state. As will be discussed, the wheel insert 110 moves into the second, expanded position and the plurality of arms 244 moves into the second, expanded state upon the application of a force F. In this example, with additional reference to FIG. 4, the force F is applied during the assembly of the wheel insert 110 to the anchor 112. In this regard, a torque T applied to the mechanical fastener 254 to couple the wheel insert 110 to the anchor 112 results in the application of the force F to the wheel insert 110. In one example, the torque T to the mechanical fastener 254 required to move the wheel insert 110 into the second, expanded position and the plurality of arms 244 into the second, expanded state is about 5 Newton meters (Nm) to about 8 Newton meters (Nm). Generally, as the annular projection 266 contacts the lip 268, the application of the force F causes the second end 248 of the wheel insert 110 to flex outwardly within the center bore 102, thereby moving one or more of the plurality of arms 244 to the second, expanded state. Stated another way, the application of the force F to the wheel insert 110 causes the wheel insert 110 to bow or deflect in a radial direction outward towards the sidewall 300 of the center bore 102 such that each of the arms 282-288 of the plurality of arms 244 move radially outward and contact the sidewall 300. As the wheel insert 110 may be composed of aluminum, which has a lower stiffness than the steel from which the anchor 112 may be composed, the application of force to the wheel insert 110 causes the wheel insert 110 to elastically deform or deflect into the second, expanded position. Thus, generally, the differences in the stiffness between the wheel insert 110 and the anchor 112 cause the wheel insert 110 to deform or deflect into the second, expanded position based on the application of the force F.

As illustrated in FIG. 11, in the second, expanded position, the second end 248 of the wheel insert 110 has a greater diameter than the second end 248 in the first position, which is shown in FIG. 4, to assist in coupling and retaining the wheel insert 110 within the center bore 102 of the rear wheel 18 (FIG. 6A). Moreover, in the second, expanded state shown in FIG. 11, each of the plurality of arms 244 are expanded radially outward to engage the sidewall 300 of the center bore (FIG. 6A). The second, expanded state enables each of the arms 282-288 to contact or grip the sidewall 300, thereby further securing the wheel insert 110 to the center bore 102 (FIG. 6A).

With reference to FIG. 4, the anchor 112 is coupled to the wheel insert 110 via the mechanical fastener 254. The anchor 112 cooperates with the mechanical fastener 254 to apply the force to the wheel insert 110 to move the wheel insert 110 into the second, expanded position and to maintain the wheel insert 110 in the second, expanded position.

The anchor 112 is composed of a metal or metal alloy, such as steel, and may be formed through stamping, casting, machining, selective metal sintering, etc. It will be understood, however, that the anchor 112 may be composed of any suitable material, such as a composite polymer, aluminum, etc. In this example, the anchor 112 is substantially shaped as a rectangle with rounded ends; however, the anchor 112 may have any desired shape. Generally, the anchor 112 is shaped such that the anchor 112 may be positioned behind the rear wheel 18 (FIG. 3) without having to remove the rear wheel 18 from the vehicle 10. The anchor 112 includes a first side 310, a second side 312, a first anchor end 314, a second anchor end 316 and defines a central anchor bore 318 that extends from the first side 310 to the second side 312. The central anchor bore 318 is defined along a central axis of the anchor 112 and includes a plurality of threads, which threadably engage the plurality of threads of the mechanical fastener 254.

The first side 310 is opposite the second side 312. The first side 310 is substantially planar for coupling against or being positioned against the rear wheel 18 to extend over a portion of the center bore 102 (FIG. 6A). The second side 312 is also substantially planar, which enables the anchor 112 to be received behind the rear wheel 18 (FIG. 6A). The first anchor end 314 is opposite the second anchor end 316. The first anchor end 314 and the second anchor end 316 are rounded to facilitate the placement of the anchor 112 behind the rear wheel 18.

Figure 12:
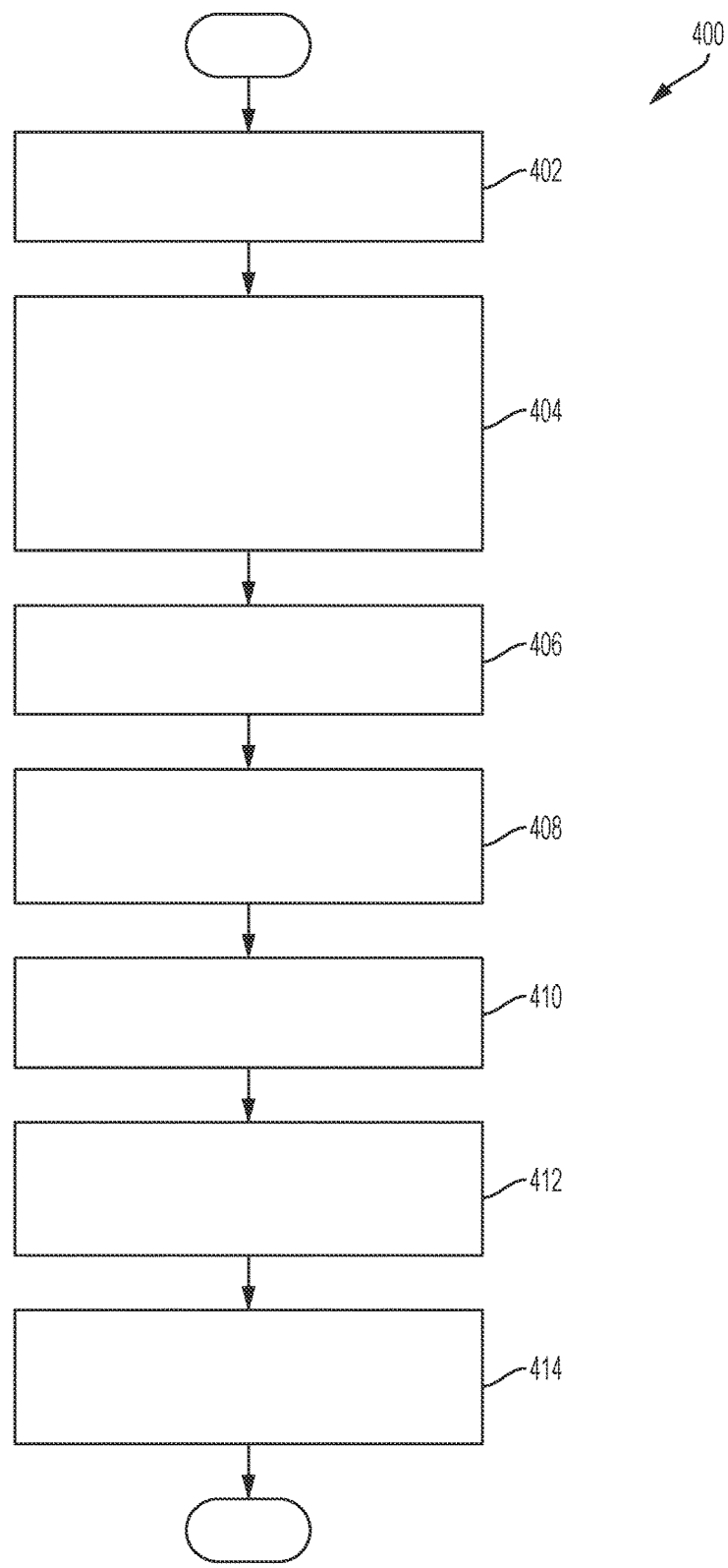
FIG. 12 is a flowchart illustrating a method for observing the rotation of the wheel with the wheel encoder system of FIG. 1, in accordance with various embodiments.

With reference to FIG. 12 and additional reference to FIGS. 3 and 4, a method 400 for coupling the wheel encoder system 100 to a respective one of the wheels 16-18 for observing a rotation of the respective wheel 16-18, such as the rear wheel 18, is shown. In one example, at 402, the wheel insert 110 is positioned into the center bore 102 in the first position. The tapers 278, 302 aid in the insertion of the wheel insert 110 into the center bore 102, and the symmetry of the wheel insert 110 assists in centering the wheel insert 110 within the center bore 102. Thus, the wheel insert 110 is self-centering within the center bore 102.

With the wheel insert 110 positioned within the center bore 102, at 404, the anchor 112 is inserted behind the rear wheel 18 such that the central anchor bore 318 is substantially coaxially aligned with the central coupling bore 252. The mechanical fastener 254 is inserted into the central coupling bore 252, and the torque T (FIG. 11) is applied to the mechanical fastener 254, via a driver, for example, to move the wheel insert 110 into the second, expanded position, which includes moving at least one or all of the plurality of arms 244 into the second, expanded state. In the second, expanded state, at least one of the plurality of arms 244 contact the sidewall 300 of the center bore 102, and further secure the wheel insert 110 to the center bore 102.

With the wheel insert 110 coupled to the center bore 102 and the anchor 112, at 406, the coupling member 108 is coupled to the wheel insert 110. In one example, the flange 232 of the coupling member 108 is inserted into the counterbore 264 (FIG. 9) of the wheel insert 110. With the flange 233 coupled to the counterbore 264, the coupling member 108 is positioned such that the coupling member bores 218 of the coupling member 108 are substantially coaxially aligned with each of the plurality of first coupling bores 250 of the wheel insert 110. The mechanical fasteners 224 are inserted through the coupling member bores 218 and the plurality of first coupling bores 250 such that the mechanical fasteners 224 threadably engage the plurality of first coupling bores 250 to couple the coupling member 108 to the wheel insert 110.

With the coupling member 108 coupled to the wheel insert 110, at 408, the mounting assembly 104 is assembled. In one example, the connector 118 is coupled to the mounting extension 116 via the mechanical fasteners 162. With the shaft 192 coupled to the disk 194, the encoder assembly 106 is positioned within the mounting bracket 114 such that the encoder coupling bores 186 are substantially coaxially aligned with the encoder coupling bores 146 of the flanges 138 and the shaft 192 extends outwardly between the flanges 138. The mechanical fasteners 190 are inserted into the encoder coupling bores 146 and the encoder coupling bores 186 and the mechanical fasteners 190 threadably engage the plurality of threads within the encoder coupling bores 186 to couple the housing 188 of the encoder assembly 106 to the mounting bracket 114. Generally, the encoder assembly 106 is assembled with the disk 194 coupled to the shaft 192, the light source 196 and the light sensor 198 coupled to the housing 188 and each of the disk 194, the light source 196 and the light sensor 198 disposed within the housing 188 prior to coupling the encoder assembly 106 to the mounting bracket 114. The mounting extension 116 is coupled to the mounting bracket 114 via the threaded mechanical fasteners 134.

With the encoder assembly 106 coupled to the mounting assembly 104, at 410, the second shaft end 202 is positioned within the central bore 214, and the set screw 228 is inserted through the set screw bore 226 to couple the shaft 192 to the coupling member 108. The support rod 164 is coupled to the connector 118, and the communication architecture 206 is coupled to the controller 34 so as to be in communication with the processor 44. This process may be repeated for each of the remaining wheels 16-18 of the vehicle 10 until each wheel 16-18 is coupled to a respective wheel encoder system 100 (FIG. 1).

With the wheel encoder system 100 coupled to the wheels 16-18 of the vehicle 10, as the wheels 16-18 rotate, the wheel insert 110 rotates with the respective wheel 16-18 as the wheel insert 110 is coupled to the center bore 102. The rotation of the wheel insert 110 causes the coupling member 108 to rotate, as the coupling member 108 is coupled to the wheel insert 110. The rotation of the coupling member 108 results in a rotation of the shaft 192, which is coupled to the coupling member 108. As the shaft 192 is coupled to the disk 194 of the encoder assembly 106, the rotation of the shaft 192 results in a rotation of the disk 194, which results in a series of light exposures through the code track 204. The light sensor 198 observes the series of light exposures caused by the rotation of the shaft 192 and generates sensor signals based on the observation at 412. The coupling between the support rod 164, the connector 118 and the mounting assembly 104 prevents the rotation of the housing 188 of the encoder assembly 106 with the vehicle 10 such that the series of light exposures through the code track 204 are generated by the rotation of the shaft 192. At 414, the sensor signals are communicated to the processor 44 of the controller 34 over the communication architecture 206, for example. The processor 44 processes the sensor signals and determines at least a speed of each of the respective wheels 16-18 based on the sensor signals received from the respective wheel encoder systems 100.

Thus, the wheel encoder system 100 of the present disclosure provides a system and method for measuring a rotation of a wheel, such as each of the wheels 16-18 of the autonomous vehicle 10, which does not require the removal of the wheel from the autonomous vehicle 10 for installation. Moreover, by coupling the wheel insert 110 to the center bore 102 of the respective wheel 16-18, the rotation of the respective wheel 16-18 may be accurately observed by the encoder assembly 106 without requiring additional modification to the wheel 16-18. Stated another way, an existing wheel may be modified to include the wheel encoder system 100 without requiring machining of the wheel 16-18 or other modifications of the mounting of the wheel to the vehicle 10. Thus, existing vehicles may be easily retrofit with the wheel encoder system 100. Moreover, the plurality of arms 244 of the wheel insert 110 enables the wheel insert 110 to be coupled to a center bore 102 without requiring a smooth finish in the center bore 102 as each of the plurality of arms 244 may move to the second, extended state without regard for burrs or other manufacturing flaws. In addition, the wheel insert 110 may be re-used as the movement of the wheel insert 110 to the second, expanded position does not result in permanent deformation of the wheel insert 110, allowing the wheel insert 110 to be removed and re-attached to the respective wheels 16-18 without requiring a replacement wheel insert 110.

Figure 13:
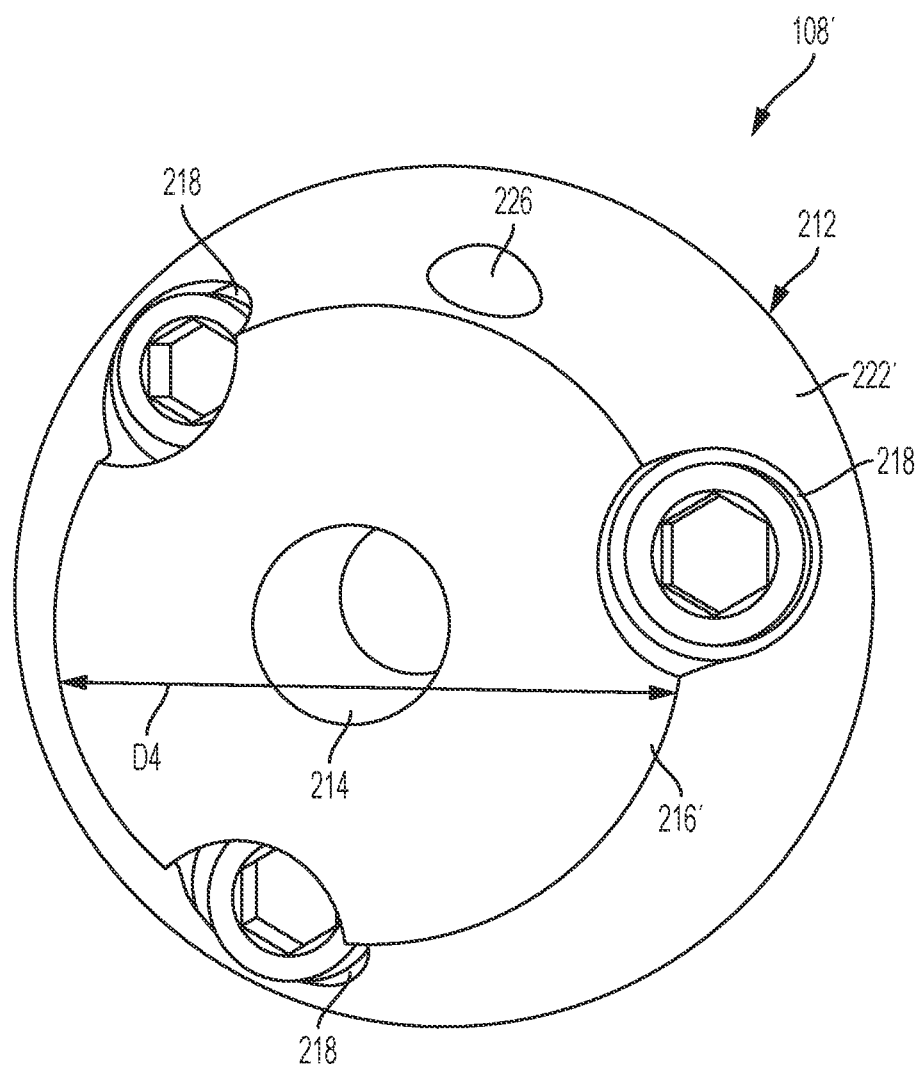
FIG. 13 is a front perspective view of another exemplary coupling member for use with the wheel encoder system of FIG. 1, in accordance with various embodiments.

It should be noted that the configuration of the wheel encoder system 100 as described herein is not limited to the configuration shown in FIGS. 3-11. In this regard, one or more components of the wheel encoder system 100 may be modified to better comport with the respective wheels 16-18. For example, with reference to FIG. 13, a coupling member 108' is shown. As the coupling member 108' is similar to the coupling member 108 described with regard to FIGS. 1-11, the same reference numerals will be used to denote the same features. The coupling member 108' couples the encoder assembly 106 (FIG. 4) to the wheel insert 110 (FIG. 4). The coupling member 108' is composed of a metal or metal alloy, such as aluminum, and may be formed through stamping, casting, machining, selective metal sintering, etc. It will be understood, however, that the coupling member 108' may be composed of any suitable material, such as a composite polymer. The coupling member 108 includes a first coupling end 210', the second coupling end 212, and defines the central bore 214 that extends through the first coupling end 210 to the second coupling end 212. The first coupling end 210 has a diameter D4, which is generally greater than the width W defined between the opposed flanges 138 of the mounting bracket 114 (FIG. 4) so that the first coupling end 210' may be positioned adjacent to the opposed flanges 138.

The first coupling end 210' includes a first surface 216' about which the plurality of coupling member bores 218 is defined. The central bore 214 also terminates at the first surface 216'. The first surface 216' is substantially planar to be positioned against the flanges 138 (FIG. 4) of the mounting bracket 114 when the coupling member 108 is coupled to the encoder assembly 106. The first surface 216' is generally circular; however, the first surface 216 may have any desired shape.

A sidewall 222' of the coupling member 108 is defined between the first coupling end 210' and the second coupling end 212. The sidewall 222' generally tapers to the first coupling end 210' from the second coupling end 212. The sidewall 222' also defines the set screw bore 226. Thus, in this example, the coupling member 108' has the sidewall 222', which has a reduced length in a longitudinal direction than the sidewall 222 of the coupling member 108. By reducing the length of the coupling member 108' compared to the coupling member 108, the coupling member 108' may be used in embodiments where it is desired to reduce an overall length of the wheel encoder system 100. Stated another way, the wheel encoder system 100 having the coupling member 108' may extend outwardly from the respective wheel 16-18 a distance which is less than a distance the wheel encoder system 100 having the coupling member 108 extends outwardly from the from the respective wheel 16-18.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for observing a rotation of a wheel of a vehicle, comprising:
a wheel insert positioned within a center bore of the wheel, the wheel insert movable between a first position and a second, expanded position and in the second, expanded position the wheel insert is coupled to the wheel for rotation with the wheel, the rotation of the wheel insert adapted to be observed by a sensor and the wheel insert includes a plurality of arms that are movable between a first state and a second, expanded state, and at least one of the plurality of arms is moved into the second, expanded state when the wheel insert is in the second, expanded position.

2. The system of claim 1, further comprising:
a sensor coupled to the wheel insert that observes the rotation of the wheel insert.

3. The system of claim 2, further comprising an encoder assembly and a coupling member coupled to the wheel insert, the encoder assembly includes the sensor and a shaft, and the coupling member includes a central bore that receives a portion of the shaft.

4. The system of claim 3, wherein the wheel insert, the coupling member and the shaft rotate with the rotation of the wheel, and the sensor observes the rotation of the shaft.

5. The system of claim 1, further comprising:
an anchor coupled to the wheel insert, the anchor coupled to the wheel insert so as to be positioned behind the center bore of the wheel.

6. The system of claim 5, further comprising a mechanical fastener coupling the anchor to the wheel insert, wherein a torque applied to the mechanical fastener moves the wheel insert from the first position to the second, expanded position.

7. The system of claim 2, further comprising:
a mounting assembly that couples the sensor to the vehicle.

8. The system of claim 1, wherein the wheel insert includes an annular projection that defines a perimeter of the wheel insert and a reinforcement portion, and the plurality of arms are spaced apart relative to each other and the reinforcement portion about the perimeter of the wheel insert.

9. The system of claim 8, wherein the reinforcement portion has a central portion and a plurality of spokes that extend from the central portion to the perimeter, and a respective sub-plurality of arms of the plurality of arms are defined between each of the plurality of spokes.

* * * * *